United States Patent
Birou et al.

(10) Patent No.: US 12,203,408 B2
(45) Date of Patent: Jan. 21, 2025

(54) ARRANGEMENT COMPRISING A PIN AND A CRANK AND TURBOCHARGER WITH SUCH AN ARRANGEMENT

(71) Applicant: Hella GmbH & Co. KGaA, Lippstadt (DE)

(72) Inventors: Florin Daniel Birou, Jud. Caras-Severin (RO); Dorin Alexandru Ionica, Jud. Timis (RO); Alexandru Rita, Jud. Timis (RO)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/351,678

(22) Filed: Jul. 13, 2023

(65) Prior Publication Data

US 2023/0358163 A1 Nov. 9, 2023

Related U.S. Application Data

(63) Continuation of application No. PCT/EP2021/051185, filed on Jan. 20, 2021.

(51) Int. Cl.
*F02B 39/04* (2006.01)

(52) U.S. Cl.
CPC .................. *F02B 39/04* (2013.01)

(58) Field of Classification Search
CPC ........ F02B 39/04; F02B 37/186; Y02T 10/12; F05D 2220/40
See application file for complete search history.

(56) References Cited

U.S. PATENT DOCUMENTS

| | | | |
|---|---|---|---|
| 10,787,957 B2* | 9/2020 | Nakajima | F02B 37/186 |
| 2013/0255250 A1* | 10/2013 | Naunheim | F01D 17/105 |
| | | | 29/890.12 |
| 2015/0118027 A1* | 4/2015 | Zieboli | F02B 37/186 |
| | | | 415/145 |
| 2016/0169093 A1* | 6/2016 | Keller | F02B 37/186 |
| | | | 29/889.21 |
| 2017/0058762 A1* | 3/2017 | Marques | F01D 25/24 |
| 2018/0094573 A1 | 4/2018 | Schoenherr et al. | |
| 2019/0211752 A1 | 7/2019 | Yanagida et al. | |

FOREIGN PATENT DOCUMENTS

| | | |
|---|---|---|
| EP | 3267009 A1 | 1/2018 |
| WO | 2013047124 A1 | 4/2013 |

\* cited by examiner

*Primary Examiner* — Hoang M Nguyen
(74) *Attorney, Agent, or Firm* — Husch Blackwell LLP

(57) ABSTRACT

An assembly is provided including a pin and a crank. The crank has a hole in which a connecting region of the pin is fixed by an interference fit to connect the pin and the crank. The hole has a substantially circular cross-section and the connecting portion has a circular cross-section. The cross-section of the hole deviates from the circular shape at one or more places and is larger at any such locations than the cross-section of the connecting portion.

10 Claims, 2 Drawing Sheets

ARRANGEMENT COMPRISING A PIN AND A CRANK AND TURBOCHARGER WITH SUCH AN ARRANGEMENT

CROSS REFERENCE

This application claims priority to PCT Application No. PCT/EP2021/051185, filed Jan. 20, 2021, the entirety of which is hereby incorporated by reference.

FIELD OF THE INVENTION

The invention relates to an arrangement comprising a pin and a crank, in particular for a turbocharger, the crank having a hole in which a connecting portion of the pin for connecting the pin and the crank is press fitted, the hole having a substantially circular cross-section and the connecting portion having a circular cross-section.

BACKGROUND OF THE INVENTION

From document EP 2 663 754 B1, a turbocharger is known to have at least one charge air valve comprising an air flow adjusting element, an actuator for adjusting the charge air valve and an arrangement of the type mentioned above. A force generated by the actuator is transmitted to the air flow adjusting element via the crank and pin arrangement. There is a press-fit connection between the crank and the pin. For this purpose the pin is pressed into the hole of the crank. The hole is slightly undersized in relation to the area of the pin that is intended to make the connection. Both the pin and the crank of such turbochargers are made of steel.

Due to tolerances, the force required to insert the pin into the hole in the crank may be big. The greater the force required for the press-fit connection, the greater the risk of damaging the crank or the pin when establishing the connection. This risk exists in particular if the diameter of the hole is at the lower end of the tolerance field for the diameter and the diameter is at the upper end of the tolerance field for the diameter of the pin.

This is where the invention comes into play.

BRIEF SUMMARY OF THE INVENTION

The invention is based on the problem of improving an arrangement of the aforementioned type in such a way that, even in the case of opposing tolerance deviations, not too big press-in forces are required to establish the connection between the pin and the crank.

According to the invention, this problem is solved by the fact that the cross-section of the hole deviates from the circular shape at at least one place and is larger than the cross-section of the connection area at this place. This deviation of the cross section of the hole from the cross section of the connection area of the pin, with opposite tolerance positions, can be used to reduce the press-fit force required to create the press-fit connection between the pin and the crank. This can be explained by the fact that the pin is deformed when pressed into the hole, so that material from the pin flows into the area of the cross-section of the hole that lies outside the circular shape of the rest of the cross-section of the hole. A supplementary or alternative explanation is that at least one point in the cross-section of the hole, which is outside the circular shape of the rest of the cross-section, makes it possible to widen the hole in the crank. Each of these effects and possibly other effects, individually or together, can cause the reduction of the press-in force to be achieved.

In an arrangement according to the invention, the cross-section of the hole can deviate from the circular shape at at least two opposite points and be larger than the cross-section of the connecting area at these points. The occurrence of the described effects can thus be simplified and their effect enhanced.

The at least one deviation of the hole from the circular form can be formed by a recess in a material of the crank, which surrounds the hole in the crank.

The crank can be designed so that a wall of the crank delimiting the hole in the crank follows a circular line, except at the at least one place where the cross-section of the hole deviates from the circular shape. The wall of the pin delimiting the hole must be free of corners and edges. Changes of direction of the wall of the pin defining the hole can be free of edges and corners.

A turbocharger according to the invention comprises at least one charge air valve having an air flow adjusting element, an actuator for adjusting the charge air valve and an arrangement according to the invention, the actuator and the adjusting element being connected to each other via the arrangement so that the actuator can drive the adjusting element to adjust the charge air valve or the air flow by means of the actuator via the arrangement. The actuator may have an output shaft connected to the crank of the arrangement of the invention and by which the crank can be driven. The pin of the arrangement of the invention may be connected to a lever or a link and the lever or link may be driven by the pin. The lever or link can be connected to the airflow adjusting element to drive the element.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

Figure 1:
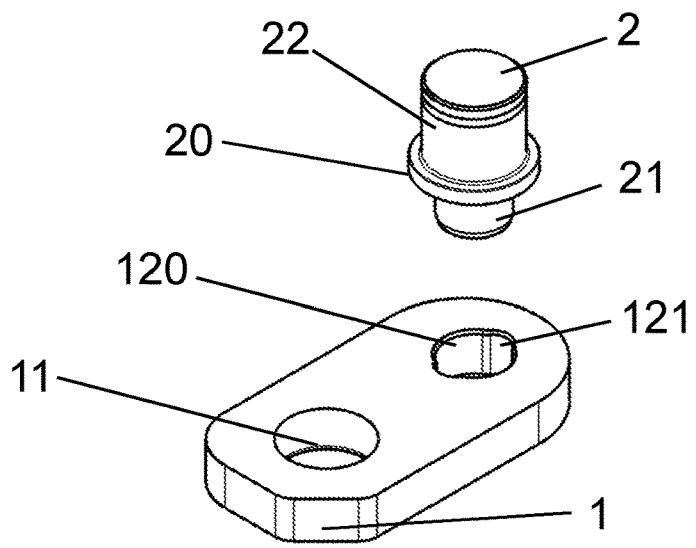
FIG. 1 shows a perspective view of the pin and the crank prior to assembly to form the arrangement according to the invention.
Figure 2:
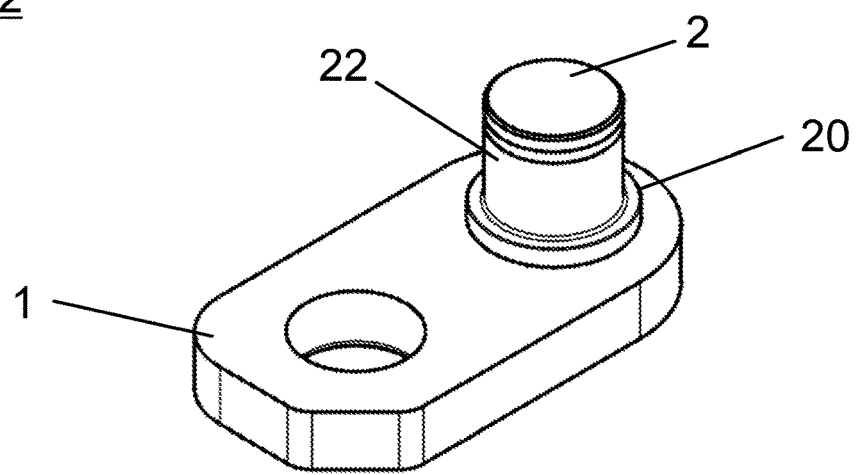
FIG. 2 is a perspective view of the arrangement from the journal and crank.
Figure 3:
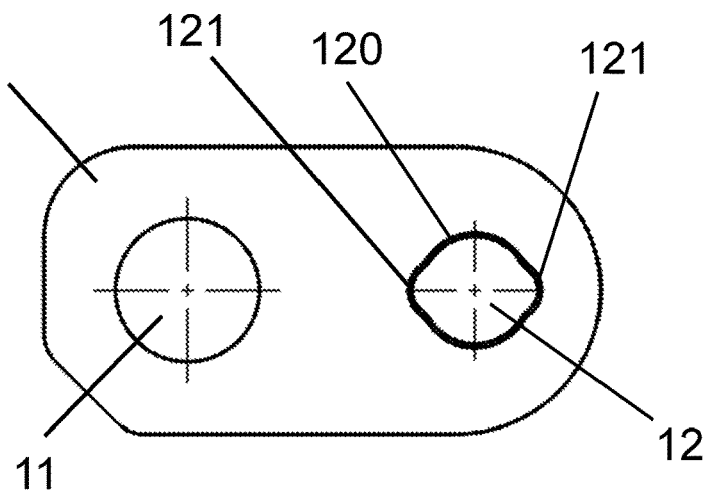
FIG. 3 is a view of a part of the bottom of the crank.
Figure 4:
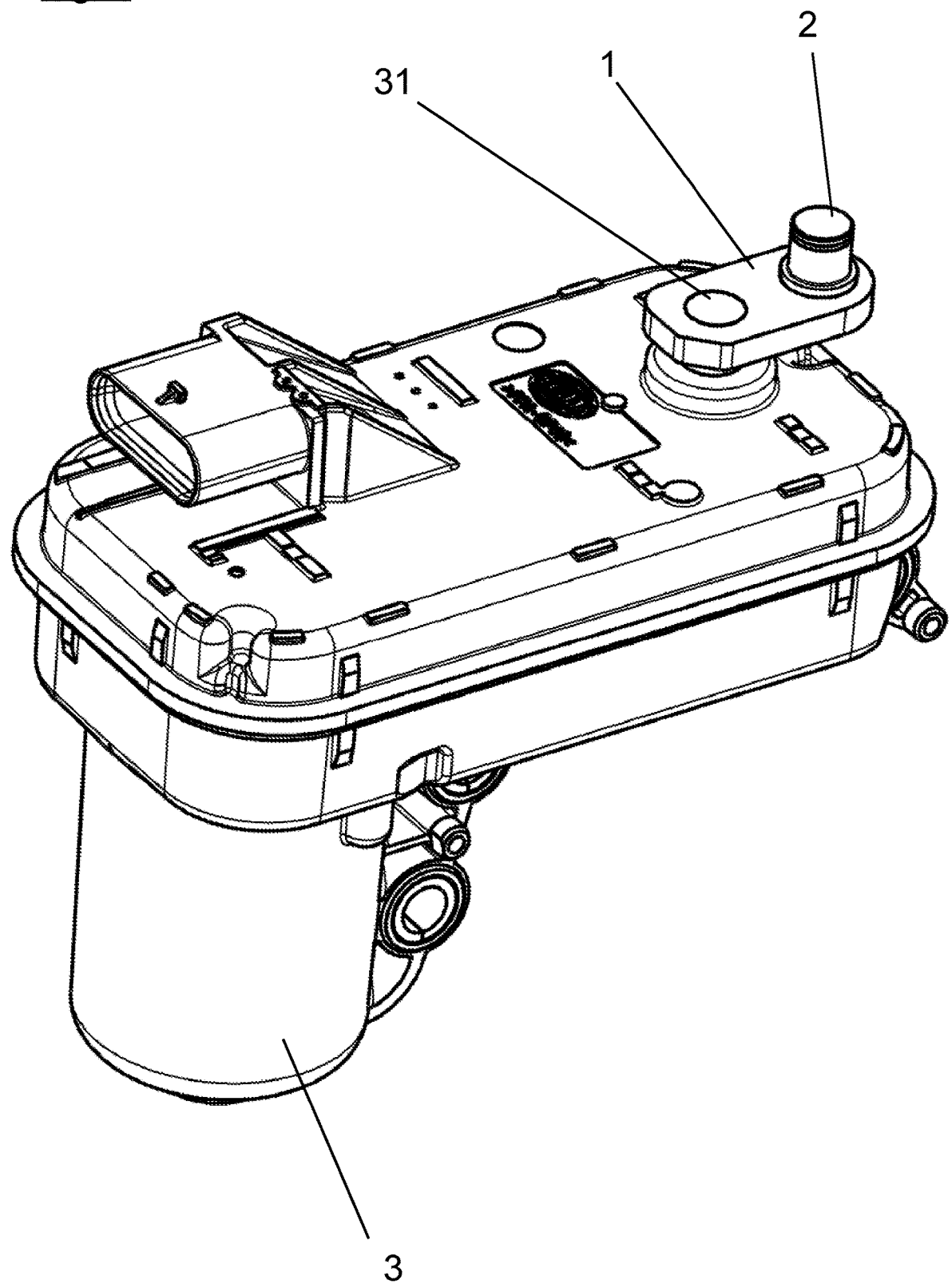
FIG. 4 is a perspective view of an actuator and its arrangement.

The crank 1 of the shown arrangement 1, 2 is formed by a flat piece of metal in which two holes 11, 12 are provided. The first hole 11 is used to fix the crank 1 to an output shaft 31 of the actuator 3. The fixing to the shaft 31 can be done in different, known ways. The second hole 12 is used to connect crank 1 with pin 2. Pin 2 has a first connecting area 21, which is circular in cross section and serves to connect pin 2 with crank 1. The pin 2 also has a second connection area 22, circular in cross-section, which is used to connect pin 2 to a mechanism through which an element for adjusting a charge air valve can be connected to the assembly. The mechanism may have a lever or a link connected to the second connection area 22. Between the first joint area 21 of pin 2 and the second joint area 22 of pin 2, pin 2 has a collar 20.

The second hole 12 has an area 120 with a circular cross-section. This area 120 is followed by two opposite recesses 121. Due to these recesses 121 the cross-section of the entire second hole 12 deviates from the circular shape. The cross-section of the entire second hole 12 is larger than the area 120 with the circular cross-section.

The diameter of the cross section of the first connecting area 21 of the pin 2, which is inserted in the second hole 12, is slightly larger than the diameter of the area 120 with the circular cross section of the second hole 12. If the second hole 12 did not have the recesses 121 outside the circular section 120, and if the first joint area 21 of the pin 2 was inserted in the second hole 12, which is then circular in section, there would be an interference fit caused by the undersize of the second hole 12 or the oversize of the first joint area 21. Depending on the position of the dimensions in the tolerance field, it can result in big forces being required to press the first connecting area of the pin 2 into the second hole 12. Through the recesses 121, through which the second hole 12 deviates from the circular shape and extends beyond the circular area 120 of the second hole 12 and also beyond the circular cross-section of the first joint area 21, it is possible to reduce the forces required to press the first joint area 21 into the second hole 12.

LIST OF REFERENCE SIGNS 1 crank handle
11 first hole
12 second hole
120 circular area of the second hole
121 recesses
2 pin
20 collar
21 first connection area
22 second connection area
3 actuator
31 output shaft

We claim:

1. An arrangement comprising:
a pin having a connecting portion; and
a crank having a hole that receives the connecting portion to connect the pin and the crank,
wherein a cross-section of the hole has a substantially circular shape but deviates from the circular shape at one or more places and is larger at the one or more places than a cross-section of the connecting portion,
wherein when the pin is in a first configuration positioned outside the hole, the connecting portion has a cross-section defined by a first shape, and
wherein when the pin is in a second configuration positioned within the hole, the connecting portion has a cross-section defined by a second shape that is different from the first shape.

2. The arrangement according to claim 1, wherein the cross-section of the hole deviates from the circular shape at two or more opposite places, and is larger than the cross-section of the connecting portion at the two or more opposite places.

3. The arrangement according to claim 1, wherein the one or more deviations of the hole from the circular shape is formed by a recess in a material of the crank surrounding the hole in the crank.

4. The arrangement according to claim 1, wherein the wall of the crank defining the hole in the crank follows a circular line, except at the one or more places where the cross-section of the hole deviates from the circular shape.

5. The arrangement according to claim 4, wherein the wall of the crank defining the hole is free of corners or edges.

6. The arrangement according to claim 5, wherein changes of direction of the wall of the crank defining the hole are free of edges and corners.

7. A turbocharger comprising:
at least one charge air valve having an air flow adjusting element,
an actuator for adjusting the charge air valve, and
an arrangement according to claim 1, wherein the actuator and the adjusting element are connected to each other via the arrangement so that the actuator drives the adjusting element to adjust the charge air valve or the air flow by the arrangement.

8. The turbocharger according to claim 7, wherein the actuator has an output shaft connected to the crank of the arrangement and with which the crank is driven.

9. The turbocharger according to claim 8, wherein the pin of the arrangement is connected to a lever or link and the lever or link is driven by the pin.

10. The turbocharger according to claim 9, wherein the lever or link is connected to the air flow adjusting element of the charge air valve to drive the air flow adjusting element of the charge air valve.

* * * * *